United States Patent Office 3,462,436
Patented Aug. 19, 1969

3,462,436
11-PIPERAZINO-DIBENZOCYCLOHEPTADIENE
DERIVATIVES
Jean Clement Louis Fouche, Bourg-la-Reine, France, assignor to Rhone-Poulenc S.A., Paris, France, a French body corporate
No Drawing. Filed Jan. 24, 1966, Ser. No. 522,399
Claims priority, application France, Jan. 27, 1965, 3,483; Nov. 30, 1965, 40,313
Int. Cl. C07d 51/76; A61k 27/00
U.S. Cl. 260—268        20 Claims

ABSTRACT OF THE DISCLOSURE

The invention provides new 11-piperazino-2-substituted-dibenzo[a,d]cycloheptadienes in which the piperazine nucleus may be N-substituted and their salts which are useful as neuroleptics, sedatives, antidepressants, antihistaminics, antiserotonins, analgesics, spasmolytics, and antiemetics.

---

This invention relates to dibenzo[a,d]cycloheptadiene derivatives and their preparation.

The invention provides the dibenzo[a,d]cycloheptadiene derivatives of the formula:

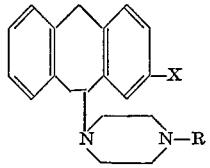

I and their acid addition salts and quaternary ammonium derivatives, in which R represents hydrogen, or an alkyl, hydroxyalkyl, hydroxyalkoxyalkyl, alkenyl, alkynyl, phenyl, phenylalkyl or phenylalkenyl radical, the said phenyl radicals being unsubstituted or substituted by one or more halogen atoms, alkyl, alkoxy, nitro, amino or trifluoromethyl radicals; X represents halogen, or a cyano, trifluoromethyl, alkyl, alkoxy, alkylthio, alkanesulphinyl or alkanesulphonyl radical, and the piperazine ring is unsubstituted on the carbon atoms or substituted by one or more methyl radicals. It is to be understood that, in every case, the alkyl radicals and the alkyl portions of the other specified radicals contain 1 to 5 carbon atoms. Similarly, the alkenyl or alkynyl radicals, as well as the alkenyl portions of the phenylalkenyl radicals, contain 2 to 5 carbon atoms.

Especially valuable compounds of Formula I are those in which X is chloro, bromo, methyl, methoxy, cyano, methylthio, methanesulphinyl, or methanesulphonyl, R is hydrogen, methyl, ethyl, allyl, 2-propynyl, 2-hydroxyethyl, benzyl, or 4-methoxybenzyl, and the piperazine ring is unsubstituted.

According to a feature of the invention, the compounds of Formula I are prepared by reacting a piperazine of the formula:

II in which R is as hereinbefore defined and the piperazine ring is optionally substituted by one or more methyl radicals with a reactive ester of the formula:

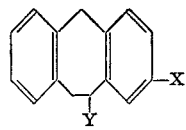

III in which X is as hereinbefore defined and Y represents a reactive ester residue, such as a halogen atom or the residue of a sulphate or sulphonate ester (for example a methanesulphonyloxy or p-toulenesulphonyloxy residue).

It is of advantage to work in an inert organic solvent such as an aromatic hydrocarbon, preferably at the boiling point of the solvent, and to use an excess of the piperazine of general Formula II as basic condensation agent.

According to a further feature of the invention, the compounds of Formula I, where R is neither hydrogen nor an optionally substituted phenyl radical, are prepared by reacting a reactive ester of the formula:

$$Y-R' \qquad (IV)$$

in which Y is as hereinafter defined and R' is the same as R but is not hydrogen, phenyl or substituted phenyl, with an 11-(1-piperazinyl)dibenzo[a,d]cycloheptadiene of the formula:

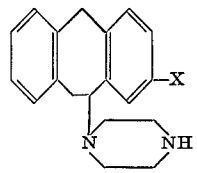

V in which X is as hereinbefore defined, and the piperazine ring is optionally substituted by one or more methyl radicals.

It is of advantage to work in an inert organic solvent such as ethanol, preferably at the boiling point of the solvent, and to carry out the reaction in the presence of a basic condensation agent, which may be an excess of the compound of Formula V.

The compounds of Formula III may be prepared from the corresponding alcohols of the formula:

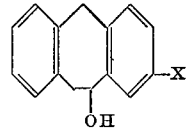

VI in which X is as hereinbefore defined as above, using known methods for preparing reactive esters from the corresponding alcohols.

The alcohols of Formula VI may be prepared by reduction of the corresponding ketones of the formula:

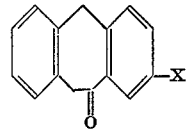

VII in which X is as hereinbefore defined. This reduction may be effected by known methods for the reduction of ketones to alcohols, more particularly by catalytic hydrogenation in the presence of Adams platinum or Raney nickel, or by reaction with an alkali metal borohydride.

The ketones of Formula VII may be prepared as follows.

(a) Where X represents a halogen atom or an alkyl, alkoxy, alkylthio or trifluoromethyl radical, by cyclisation of compounds of the formula:

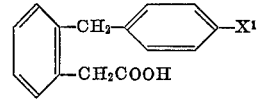

VIII in which $X^1$ represents halogen, alkyl, alkoxy, alkylthio or trifluoromethyl. This cyclisation is with advantage carried out by heating the compounds of Formula VIII in the presence of polyphosphoric acid or its esters, preferably to a temperature of from 60 to 180° C. It is also possible to convert the compounds of Formula VIII by known methods into the corresponding acid chlorides, and then to carry out the cyclisation of the latter by a Friedel-Crafts reaction, for example using aluminium chloride in a solvent such as carbon disulphide.

The acids of Formula VIII may themselves be prepared by esterification of an acid of the formula:

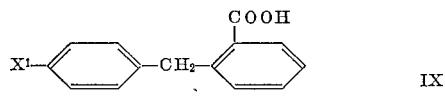

IX with methanol, followed by reduction of the ester obtained to give the derivative of the formula:

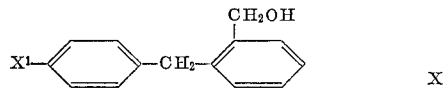

X which is treated with a halogenating agent to produce the compound of the formula:

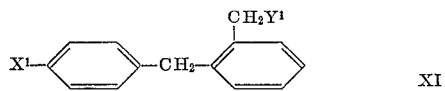

XI in which $X^1$ is as hereinbefore defined and $Y^1$ represents halogen, preferably chlorine, and finally the compound of Formula XI is reacted with an alkali metal cyanide to produce a compound of the formula:

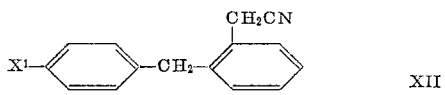

XII which is then hydrolysed to the acid of Formula VIII. The acids of Formula VIII in which $X^1$ is alkyl, alkoxy, or alkylthio, each of 1 to 4 carbon atoms, or halogen or trifluoromethyl and their preparation are described in my copending application No. 522,348, filed on even date herewith. Acids of Formula VIII in which $X^1$ is alkyl, alkoxy or alkylthio, each of 5 carbon atoms, are prepared in an analogous manner.

(b) Where X is a cyano radical, from the corresponding 2 - halogeno - 11 - oxo-dibenzo[a,d]cycloheptadiene using known methods for converting halogen compounds into cyano compounds.

(c) Where X is alkanesulphinyl or alkanesulphonyl, by oxidation of the corresponding compound of Formula VII in which X represents alkylthio.

According to a further feature of the invention, the compounds of Formula I where X represents alkanesulphinyl or alkanesulphonyl are prepared by oxidising a compound of Formula I in which X represents alkylthio, or, in the case of compounds of Formula I in which X is alkanesulphonyl, by oxidation of a compound of Formula I in which X represents alkanesulphinyl. These oxidation reactions may, for example, be carried out with hydrogen peroxide in an acetic acid medium.

The compounds of Formula I may optionally be purified by physical methods (such as distillation, crystallisation or chromatography) or by chemical methods (such as salt formation, and crystallisation of these salts followed by decomposition in an alkaline medium). In these operations, the nature of the anion of the salt is unimportant, the only condition being that the salt should be well defined and easily crystallisable.

The new compounds may be converted into acid addition salts and into quaternary ammonium derivatives.

The acid addition salts may be obtained by reaction of the bases with acids in suitable solvents. Organic solvents which may be used are, for example, alcohols, ethers, ketones or chlorinated solvents. The salt formed precipitates, sometimes after concentration of the solution, and is removed by filtration or decantation. The quaternary ammonium salts may be obtained by reaction of the bases with esters, optionally in an organic solvent, at ordinary temperature or, more rapidly, with gentle heating.

The new compounds, both as bases and as their acid addition salts and quaternary ammonium derivatives, have interesting pharmacodynamic properties. In particular, they have a marked effect on the central nervous system, acting as neuroleptics, sedatives and anti-depressants. They also show strong antihistamine, antiserotin, analgesic, spasmolytic and anti-emetic activity.

For therapeutic purposes, the dibenzo[a,d]cycloheptadiene derivatives of Formula I are employed as such or, when appropriate, in the form of non-toxic acid addition salts, i.e. salts containing anion which are relatively innocuous to the animal organism in therapeutic doses of the salts (such as hydrochlorides and other hydrohalides, phosphates, nitrates, sulphates, acetates, propionates, succinates, benzoates, fumarates, maleates, theophyllinacetates, salicylates, phenolphthalinates and methylene-bis-$\beta$-hydroxynaphthoates) so that the beneficial physiological properties inherent in the bases are not vitiated by side-effects ascribable to the anions. They may also be employed, when appropriate, in the form of non-toxic quaternary ammonium salts obtained by reaction with organic halides (e.g. methyl, ethyl, allyl or benzyl chloride, bromide or iodide) or other reactive esters, e.g. methyl- or ethyl - sulphates, benzenesulphonates or toluene - p-sulphonates.

The following examples illustrate the invention.

Example 1

A solution of thionyl chloride (14.7 cm.$^3$) in chloroform (100 cm.$^3$) is added over the course of 3 hours to a stirred solution, kept at about 2° C., of 2-methoxy-11-hydroxy-dibenzo[a,d]cycloheptadiene (16.4 g.) in chloroform (130 cm.$^3$). The reaction mixture is stirred for a further hour whilst the temperature is allowed to rise to 20° C. The chloroform is then driven off at 20 mm. Hg on a water bath kept below 40° C. The residue obtained is taken up in anhydrous benzene (100 cm.$^3$), and again evaporated under 20 mm. Hg at below 40° C.

The 2-methoxy-11-chloro-dibenzo[a,d]cycloheptadiene so obtained is dissolved in benzene (200 cm.$^3$), and this solution is gradually poured, over the course of 20 minutes, into a stirred mixture of 1-methylpiperazine (27.3 g.) in benzene (130 cm.$^3$) heated under reflux. The mixture is heated for 15 hours. It is then cooled and water (230 cm.$^3$) and diethyl ether (230 cm.$^3$) are added. The mixture is decanted and the aqueous layer is washed with diethyl ether (100 cm.$^3$). The combined ethereal solutions are washed with water (400 cm.$^3$). The ethereal solution is then extracted with N methanesulphonic acid (200 cm.$^3$), decanted, and the acid layer washed with diethyl ether, (50 cm.$^3$). The aqueous solution of the methanesulphonate is made alkaline with caustic soda solution ($d=1.33$, 50 cm.$^3$) and the base liberated is extracted with diethyl ether (500 cm.$^3$). The ethereal solution obtained is dried over anhydrous sodium sulphate, filtered, and evaporated at 20 mm. Hg. 10.9 g. of a yellow resin are obtained. This resin is dissolved in ethanol (40 cm.$^3$), and an 0.7 N solution of hydrochloric acid in ethanol (43.9 cm.$^3$) is added. The hydrochloride of the base crystallizes out of the solution, which is left overnight in a refrigerator. The crystals are filtered off and 6.5 g. of product are obtained. The mother liquors are concentrated to a quarter of their volume at 20 mm. Hg and diethyl ether (75 cm.$^3$) is added. A second crop of 3.3 g. of crystals, similar to the first crop, is obtained. These two crops are combined to give 9.8 g. of the monohydrochloride of 2-methoxy-11-(4-methyl - 1 - piperazinyl)dibenzol[a,d]cycloheptadiene, M.P. 203–205° C.

The 2-methoxy - 11 - hydroxy-dibenzo[a,d]cycloheptadiene used as starting material is prepared as follows. 2-(4-methoxybenzyl)-phenyl-acetic acid (M.P.=70° C., 154 g.) is added over the course of 30 minutes to a stirred mixture, heated to 80° C., of ortho-phosphoric acid ($d=1.71$, 900 cm.³) and phosphorus pentoxide (1500 g.). The reaction mixture is kept at 80° C. for a further 90 minutes, and then allowed to cool. It is poured over a mixture of ice (3 kg.) and diethyl ether (3 litres) with stirring. The mixture is decanted and the aqueous layer then washed with diethyl ether (2 litres). The diethyl ether solutions are combined and washed with water (1 litre), followed by 0.5 N caustic soda solution (600 cm.³) and finally water (1 litre). The solution obtained is dried over anhydrous sodium sulphate in the presence of decolourising charcoal, and is then filtered and evaporated at 20 mm. Hg. 119.3 g. of a red oil are obtained, which is distilled. 87 g. of a product boiling at about 200° C./0.7 mm. Hg are obtained, which, after recrystallisation from ethanol (170 cm.³) yields 2-methoxy-11-oxo-dibenzo[a,d]cycloheptadiene (80 g.), M.P. 82–84° C.

2-methoxy-11-oxo-dibenzo[a,d]cycloheptadiene (21 g.) is dissolved in methanol (200 cm.³) with gentle warming to 50° C., and the solution obtained is hydrogenated with stirring at about 30–40° C. at atmospheric pressure in the presence of Adams platinum (1.75 g.). The theoretical amount of hydrogen is absorbed in 90 minutes. The mixture is filtered, the residue is washed with methanol, and the combined filtrates evaporated at 20 mm. Hg. The resin (20.6 g.) so obtained is crystallised from di-isopropyl ether (100 cm.³) in the presence of decolourising charcoal. 2-methoxy-11-hydroxy-dibenzo[a,d]cycloheptadiene (18.9 g.), M.P. 82° C., is thus obtained.

Example 2

A solution of thionyl chloride (13 cm.³ in chloroform (80 cm.³) is poured over the course of 30 minutes into a stirred solution, maintained at about 2° C., of 2-chloro-11-hydroxy-dibenzo[a,d]cycloheptadiene (14.6 g.) in chloroform (120 cm.³). The temperature is allowed to rise to 18° C. over the course of 30 minutes, and the mixture then evaporated at 7 mm. Hg on a water bath at 25° C. The residue is taken up in chloroform (20 cm.³) and again evaporated. The residue obtained is dissolved in anhydrous benzene (20 cm.³). This solution is gradually poured, over the course of 30 minutes, into a stirred mixture of 1-methyl-piperazine (24 g.) in dimethylformamide (5 cm.³) and benzene (30 cm.³) heated under reflux. The mixture is heated under reflux for a further 3 hours. After cooling, water (150 cm.³) and diethyl ether (150 cm.³) are added. The mixture is stirred and decanted. The aqueous layer is washed with diethyl ether (100 cm.³) and the combined ethereal solutions are washed with water (200 cm.³) until neutral. The ethereal solution is then extracted with N methanesulphonic acid (100 cm.³). This mixture is decanted and the aqueous acid solution is washed with diethyl ether (100 cm.³). The acid solution of the methanesulphonate is made alkaline with caustic soda solution ($d=1.33$, 15 cm.³). The base liberated is extracted with diethyl ether (75 cm.³), and the extract is washed with water (250 cm.³) until neutral. It is then dried over anhydrous sodium sulphate, filtered, and evaporated at 20 mm. Hg. 5.2 g. of resin are obtained, and crystallised from di-isopropyl ether (20 cm.³). 2-chloro-11-(4-methyl-1-piperazinyl)dibenzo[a,d]cycloheptadiene (5 g.), M.P. 115° C., is obtained.

The 2-chloro-11-hydroxy-dibenzo[a,d]cycloheptadiene used as starting material is prepared as follows. 2-(4-chlorobenzyl)-phenyl-acetic acid (M.P.=140° C. 52 g.) is added over the course of 30 minutes to a stirred mixture of ortho-phosphoric acid ($d=1.71$, 300 cm.³), and phosphorus pentoxide (500 g.) heated to 100° C. The mixture is heated with stirring for 4½ hours, whilst the internal temperature is raised to 135° C. The reaction mixture is allowed to cool to about 80° C. and is then poured with stirring over ice (1 kg.) and methylene chloride (0.8 litre). This mixture is decanted, the aqueous layer washed with methylene chloride (0.8 litre), and the combined organic layer then washed with water (0.5 litre), followed by N caustic soda solution (50 cm.³), and finally water (200 cm.³). The methylene chloride solution is then dried over anhydrous sodium sulphate in the presence of decolourising charcoal, filtered, and evaporated at 20 mm. Hg. 47.6 g. of resin is obtained, which is crystallised from cyclohexane (175 cm.³). 30 g. of crystals are obtained, with a further 8 g. on concentration of the mother liquors, giving a total of 38 g. of 2-chloro-11-oxo-dibenzo-[a,d]cycloheptadiene, M.P. 104° C.

2-chloro-11-oxo-dibenzo[a,d]cycloheptadiene (41.7 g.) is dissolved in methanol (1400 cm.³), and the solution is cooled to 5° C. and poured over the course of 30 minutes into a solution of potassium borohydride (8.7 g.) in water (48 cm.³) and 0.1 N caustic soda solution (8 drops). The mixture is stirred for a further hour and allowed to stand overnight. Water (100 cm.³) is progressively added over the course of 10 minutes. Part of the methanol is distilled off at 2 mm. Hg with heating on a water bath at 45° C., and diethyl ether (300 cm.³), caustic soda solution ($d=1.33$, 65 cm.³), and water (115 cm.³), are then added. The mixture is stirred and then decanted. The aqueous layer is washed with diethyl ether (100 cm.³). The combined ethereal solutions are washed with water (175 cm.³) until neutral. They are dried over anhydrous sodium sulphate, filtered, and evaporated at 20 mm. Hg. 38.5 g. of resin are obtained which is dissolved in boiling cyclohexane (120 cm.³). Decolourising charcoal is added, and the mixture filtered and placed in the refrigerator. 28.7 g. of crystals are obtained, with a further 1.3 g. on concentration of the mother liquors, giving a total of 30 g. of 2-chloro - 11 - hydroxy - dibenzo[a,d]cycloheptadiene, M.P. 80–84° C.

Example 3

A solution of 2,11-dichloro-dibenzo[a,d]cycloheptadiene [prepared as described in Example 2, but starting from 2-chloro-11-hydroxy-dibenzo[a,d]cyclophentadiene (24.6 g.)] in benzene (100 cm.³) is poured gradually (over 40 minutes) into a stirred mixture of 1-benzylpiperazine (52.8 g.) in benzene (160 cm.³) heated under reflux. The mixture is heated under reflux for 15 hours. After cooling, water (50 cm.³), N caustic soda solution, (10 cm.³), and diethyl ether (50 cm.³) are added. The mixture is decanted and the aqueous layer then washed with diethyl ether (100 cm.³). The ethereal layers are combined and washed with water (3 litres) until neutral. The ethereal layer is then extracted with N methanesulphonic acid (300 cm.³). The acid solution of the methanesulphonate is made alkaline with caustic soda solution ($d=1.33$, 40 cm.³). The base liberated is extracted with benzene (400 cm.³). The benzene solution is washed with water (1 litre) until neutral, dried over anhydrous sodium sulphate, filtered and evaporated under reduced pressure (20 mm. Hg). 9.4 g. of base are obtained, which is crystallised from di-isopropyl ether (60 cm.³). 2-chloro-11-(4-benzyl - 1 - piperazinyl)dibenzo[a,d]cycloheptadiene (7.1 g.), M.P. 138° C. is obtained.

Example 4

By working as in Example 3, but starting with 172 g. of anhydrous piperazine and a benzene solution of 2,11-dichloro-dibenzo[a,d]cycloheptadiene (produced from 2-chloro - 11 - hydroxy-dibenzo[a,d]cycloheptadiene, 122.4 g.), 2-chloro-11-(1-piperazinyl)-dibenzo[a,d]-cycloheptadiene (23 g.) is obtained, M.P. 114° C. after recrystallisation from acetonitrile.

Example 5

A mixture of 2-chloro-11-(1-piperazinyl)-dibenzo[a,d] cycloheptadiene (6.25 g.) in dimethylformamide (80 cm.³), 4-methoxybenzyl chloride (3.13 g.) and sodium bicarbonate (3.36 g.) is heated under reflux with stirring for 5 hours. After cooling, water (800 cm.³) and diethyl ether (200 cm.³) are added. The mixture is decanted and the aqueous layer then washed with diethyl ether (200 cm.³). The ethereal layers are combined and washed with water (300 cm.³) until neutral. They are then extracted with N aqueous methanesulphonic acid solution (300 cm.³). The acid extract is washed with diethyl ether 100 cm.³) and then made alkaline with caustic soda solution ($d=1.33$, 35 cm.³). The base is extracted with diethyl ether (300 cm.³) and the ethereal solution is washed with water until neutral, dried over anhydrous sodium sulphate, filtered and evaporated. 2-chloro-11-[4-(4-methoxybenzyl)-1-piperazinyl]dibenzo[a,d]cycloheptadiene (8.5 g.) is obtained, the monohydrochloride of which, prepared in diethyl ether, melts at 232° C.

Example 6

By working as in Example 3, but using a benzene solution of 2,11-dichloro-dibenzo[a,d]cycloheptadiene (produced from 2-chloro-11-hydroxy-dibenzo[a,d]cycloheptadiene, 24.6 g.) and 1-ethylpiperazine (45.2 g.), 2-chloro-11 - (4 - ethyl - 1 - piperazinyl)dibenzo[a,d]cycloheptadiene (7 g.) is obtained, which after recrystallisation from acetonitrile, melts at 96° C.

Example 7

By working as in Example 3, but using a benzene solution of 2,11-dichloro-dibenzo[a,d]cycloheptadiene (produced from 2-chloro-11-hydroxy-dibenzo[a,d]cycloheptadiene, 24.6 g.) and 1-allylpiperazine (37.8 g.), 2-chloro-11 - (4 - allyl - 1 - piperazinyl)dibenzo[a,d]cycloheptadiene (13.2 g.) is obtained, the di-hydrochloride of which, prepared in diethyl ether, melts at 210–212° C.

Example 8

By working as in Example 3, but using a benzene solution of 2,11-dichloro-dibenzo[a,d]cycloheptadiene (produced from 2-chloro-11-hydroxy-dibenzo[a,d]cycloheptadiene, 24.6 g.) and 1-(2-propynyl))-piperazine (37.2 g.), 2 - chloro - 11 - [4 - (2 - propynyl) - 1 - piperazinyl]dibenzo[a,d]cycloheptadiene (6 g.) is obtained which, after recrystallisation from acetonitrile, melts at 100° C.

Example 9

By working as in Example 3, but using a benzene solution of 2,11-dichloro-dibenzo[a,d]cycloheptadiene (produced from 2-chloro-11-hydroxy-dibenzo[a,d]cycloheptadiene, 24.6 g.) and 1-(2-hydroxyethyl)-piperazine (39 g.), 2 - chloro - 11 - [4 - (2 - hydroxyethyl) - 1 - piperazinyl] dibenzo[a,d]cycloheptadiene (9.5 g.), is obtained, M.P. 128° C. after recrystallisation from acetonitrile.

Example 10

By working as in Example 3, but using a benzene solution of 2-bromo-11-chloro-dibenzo[a,d]cycloheptadiene (produced from 2-bromo-11-hydroxy-dibenzo[a,d]cycloheptadiene, 19.2 g.) and 1-methylpiperazine (20 g.), 2-bromo - 11 - (4 - methyl - 1 - piperazinyl)dibenzo[a,d] cycloheptadiene (8.5 g.) is obtained, which, after recrystallisation from di-isopropyl ether, melts at 126° C.

The benzene solution of 2-bromo-11-chloro-dibenzo-[a,d]-cycloheptadiene is prepared as follows: 2-bromo-11-oxo-dibenzo[a,d]cycloheptadiene (M.P. 106° C., 43.8 g.) is prepared by cyclisation of 2-(4-bromobenzyl)-phenylacetic acid (M.P.=166° C., 68 g.) in the presence of ortho-phosphoric acid ($d=1.71$, 165 cm.³) and phosphorus pentoxide (280 g.), working as indicated in Example 2 for 2-chloro-11-oxo-dibenzo[a,d]cycloheptadiene.

2-bromo-11-oxo-dibenzo[a,d]cycloheptadiene (28.7 g.) is reduced with potassium borohydride (5.4 g.) to give 2-bromo - 11 - hydroxy-dibenzo[a,d]cycloheptadiene (28.5 g.), M.P. 106° C. This compound (19.2 g.) is then reacted with thionyl chloride, as described for the corresponding reactions in Example 2.

Example 11

By working as in Example 3, but using a benzene solution of 2 - cyano-11-chloro-dibenzo[a,d]cycloheptadiene (produced from 2-cyano-11-hydroxy-dibenzo[a,d]cycloheptadiene, 3 g.) and 1-methylpiperazine (5.1 g.), 2-cyano - 11 - (4 - methyl - 1 - piperazinyl)dibenzo[a,d]cycloheptadiene (1.8 g.) is obtained, which, after recrystallisation from ethanol, melts at 175° C.

The 2 - cyano-11-hydroxy-dibenzo[a,d]cycloheptadiene used as starting material is prepared as follows. 2 bromo-11-oxo-dibenzo[a,d]cycloheptadiene (7 g.) is heated under reflux with stirring 1 hour with N-methylpyrrollidone (98 cm.³) and cuprous cyanide (11 g.). The reaction mixture is cooled to 50° C., and then poured into a solution of potassium cyanide (32 g.) in water 1000 cm.³). The mixture is extracted with diethyl ether (1400 cm.³). The ethereal layer is washed with water (200 cm.³), N-hydrochloric acid (400 cm.³), and water (1200 cm.³), and is then dried over anhydrous magnesium sulphate, filtered, and evaporated at 20 mm. Hg. The residue is recrystallised from acetonitrile, and 2-cyano-11-oxo-dibenzo[a,d] cycloheptadiene (3.2 g.), M.P. 145° C., is obtained.

By treating 3.2 g. of this compound with potassium borohydride, and working as described in Examples 1 and 2, 2-cyano-11-hydroxy-dibenzo[a,d]cycloheptadiene (3.2 g.) is obtained as an oil. It is used in the crude form without purification.

Example 12

By working as in Example 3, but using a benzene solution of 2-methyl-11-chloro-dibenzo[a,d]cycloheptadiene (produced from 2-methyl-11-hydroxy-dibenzo[a,d]cycloheptadiene, 44.8 g.) and 1-methyl-piperazine (80 g.), 2-methyl-11 - (4 - methyl - 1 - piperazinyl)dibenzo[a,d]cycloheptadiene (28.1 g.) is obtained, which, after recrystallisation from di-isopropyl ether, melts at 95° C.

The 2-methyl-11-hydroxy-dibenzo[a,d]cycloheptadiene used as starting material is prepared as follows. A mixture of polyphosphoric acid (279 g.) with 2-(4-methylbenzyl)phenylacetic acid (M.P.=124° C., 303 g.) is heated at 100° C. for 3 hours, and 2-methyl-11-oxo-dibenzo[a,d]cycloheptadiene, (207 g.), M.P. 65° C., is obtained.

By treating 2-methyl-11-oxo-dibenzo[a,d]cycloheptadiene (55.5 g.) with potassium borohydride (27 g.) as described in Examples 1 and 2, 2-methyl-11-hydroxy-dibenzo[a,d]cycloheptadiene (55.3 g.) is obtained. It melts at 85° C. after recrystallisation from di-isopropyl ether.

Example 13

By working as in Example 3, but using a benzene solution of 2-methylthio-11-chloro-dibenzo[a,d]cycloheptadiene (produced from 2-methylthio-11-hydroxy-dibenzo-[a,d]cycloheptadiene, 7.7 g.) and 1-(4-methoxybenzyl) piperazine, (12.4 g.), 2-methylthio-11-[4-(4-methoxybenzyl)-1-piperazinyl]dibenzo[a,d]cycloheptadiene, (2.4 g.) is obtained, the monohydrochloride of which, prepared in diethyl ether-ethanol medium, melts at 203–205° C.

The 2-methylthio-11-hydroxy-dibenzo[a,d]cycloheptadiene used as starting material is prepared as follows. A mixture of polyphosphoric acid (1280 g.) and 2-(4-methylthiobenzyl)phenylacetic acid (M.P.=138° C., 136 g.) is heated at 91–92° C. for 6 hours, and 2-methylthio-11-oxo-dibenzo[a,d]cycloheptadiene (97.5 g.) is obtained, M.P. 104° C. after recrystallisation from ethanol. By treating 2-methylthio-11-oxo-dibenzo[a,d]cycloheptadiene (39.8 g.) with potassium borohydride (8.4 g.), 2-methylthio - 11 - hydroxy-dibenzo[a,d]cycloheptadiene (40 g.) is obtained, which melts at 95° C. after recrystallisation from di-isopropyl ether.

Example 14

By working as in Example 3, but using a benzene solution of 2-methylthio - 11 - chloro - dibenzo[a,d]cycloheptadiene (produced from 2-methylthio-11-hydroxy-dibenzo[a,d]cycloheptadiene, 14.3 g.) and anhydrous piperazine (19.3 g.), 3.7 g. of base are obtained which, on addition of ethanol saturated with hydrogen chloride gas, yield 2-methylthio-11-(1-piperazinyl)dibenzo[a,d] cycloheptadiene dihydrochloride (4.3 g.), M.P. about 198–200° C.

Example 15

A mixture of 2-methylthio-11-(1-piperazinyl)dibenzo [a,d]cycloheptadiene dihydrochloride (4.7 g.) in dimethylformamide (60 cm.$^3$), 4-methoxybenzyl chloride (1.9 g.), and sodium bicarbonate (6 g.) is heated under reflux, with stirring, for 5 hours. The greater part of the dimethylformamide is removed by distillation under reduced pressure (10 mm. Hg). The residue is taken up in water (100 cm.$^3$) and diethyl ether (100 cm.$^3$). The aqueous layer is washed with diethyl ether (100 cm.$^3$), and the ethereal solutions are combined and washed with water (100 cm.$^3$). They are then extracted, first with N methanesulphonic acid (55 cm.$^3$) and then with water (60 cm.$^3$), and the extracts are combined. After washing with diethyl ether (50 cm.$^3$), the combined extracts are made alkaline with caustic soda solution (D=1.33, 20 cm.$^3$). The liberated base is extracted with diethyl ether (350 cm.$^3$). The ethereal extract is washed with water until neutral, dried over anhydrous sodium sulphate, filtered and evaporated. 2-methylthio-11-[4-(4-methoxybenzyl) - 1 - piperazinyl]dibenzo[a,d]cycloheptadiene (5 g.) is obtained, the monohydrochloride of which, prepared in a diethyl ether-ethanol medium, melts at 203–205° C., and is identical with the product of Example 13.

Example 16

By working as in Example 3, but using a benzene solution of 2-methylthio-11-chloro-dibenzo[a,d]cycloheptadiene (produced from 2-methylthio-11-hydroxy-dibenzo [a,d]cycloheptadiene, 24.8 g.) and 1-methylpiperazine (38.8 g.), 2-methylthio-11-(4-methyl-1-piperazinyl(dibenzo[a,d]cycloheptadiene (14.8 g.) is obtained, which, after recrystallisation from acetonitrile, melts at 102° C.

Example 17

A solution of aqueous hydrogen peroxide (130 volumes, 4 cm.$^3$) in acetic acid (20 cm.$^3$), is added dropwise with stirring over the course of 10 minutes to a solution of 2-methylthio - 11 - (4 - methylpiperazinyl)dibenzo[a,d]cycloheptadiene (14.5 g.) in acetic acid (75 cm.$^3$) and sulphuric acid ($d$=1.83, 2.4 cm.$^3$), cooled to 10° C. The mixture is allowed to stand overnight, and water (100 cm.$^3$) is then added. This mixture is then cooled in an ice bath and made alkaline by addition to caustic soda solution ($d$=1.33, 175 cm.$^3$) over the course of 1 hour. The product is stirred with ethyl acetate (150 cm.$^3$) and decanted, and the aqueous layer is washed with ethyl acetate (300 cm.$^3$). The ethyl acetate extracts are combined, washed with water (200 cm.$^3$), and then dried over anhydrous sodium sulphate. After filtration and evaporation under reduced pressure, 16.6 g. of product are obtained, which is recrystallised from diisopropyl ether (150 cm.$^3$). 2-methanesulphinyl-11-(4-methyl-1-piperazinyl)dibenzo[a,d]cycloheptadiene (14.1 g.), M.P. 136° C., is obtained.

Example 18

Working as in Example 3, but using a benzene solution of 2-methanesulphonyl-11-chloro-dibenzo[a,d]cycloheptadiene (produced from 2-methanesulphonyl-11-hydroxydibenzo[a,d]cycloheptadiene, 8.6 g.) and 1 - methylpiperazine (12 g.), 2-methanesulphonyl-11-(4-methyl-1-piperazinyl)dibenzo[a,d]cycloheptadiene (5.6 g.) is obtained, the acid dimaleate of which, prepared in ethanol, melts at about 100° C.

The 2-methanesulphonyl-11-hydroxy-dibenzo[a,d]cycloheptadiene used as starting material is prepared as follows. A solution of 2-methylthio-11-oxo-dibenzo[a,d] cycloheptadiene (25.4 g.) in chloroform (250 cm.$^3$) is added over the course of 20 minutes to a stirred suspension of p-nitroperbenzoic acid (44 g.) in chloroform (1000 cm.$^3$) cooled to 20° C. Stirring is continued at ambient temperature for 14 hours, and the p-nitrobenzoic acid produced is filtered off and washed with chloroform (300 cm.$^3$). The combined chloroform solutions are washed with a 5% aqueous solution of sodium bicarbonate (750 cm.$^3$), followed by water (500 cm.$^3$). They are then dried over anhydrous sodium sulphate, filtered, and evaporated under reduced pressure. The residue is crystallised from acetonitrile (100 cm.$^3$). 2-methanesulphonyl-11-oxo-dibenzo[a,d]cycloheptadiene, (22.7 g.), M.P. 175° C., is thus obtained.

By treating 2-methanesulphonyl-11-oxo-dibenzo[a,d] cycloheptadiene (18.6 g.) with potassium borohydride (3.5 g.) in the manner indicated in Examples 1 and 2, 2 - methanesulphonyl - 11 - hydroxy - dibenzo[a,d]cycloheptadiene (18 g.) is obtained, which, after recrystallisation from ethanol (90 cm.$^3$), melts at 134–135° C.

The present invention includes within its scope pharmaceutical compositions which comprise at least one of the compounds of general Formula I, or non-toxic acid addition or quaternary ammonium salt thereof, in association with a pharmaceutically acceptable carrier or coating. In clinical practice the compounds of the present invention will normally be administered orally, parenterally or rectally.

Solid compositions for oral administration include compressed tablets, pills, powders, and granules. In such solid compositions one or more of the active compounds is, or are, admixed with at least one inert diluent such as starch, sucrose or lactose. The compositions may also comprise, as in normal practice, additional substances other than inert diluents, e.g. lubricating agents, such as magnesium stearate. Liquid compositions for oral administration include pharmaceutically-acceptable emulsions, solutions, suspensions, syrups and elixirs containing inert diluents commonly used in the art, such as water and liquid paraffin. Besides inert diluents, such compositions may also comprise adjuvents, such as wetting and suspending agents, and sweetening, flavouring, perfuming and preserving agents. The compositions according to the invention, for oral administration, also include capsules of absorbable material such as gelatin containing one or more of the active substances with or without the addition of diluents or excipients.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation or by heating. They may also be manufactured in the form of sterile solid compositions, which can be dissolved in sterile water or some other sterile injectable medium immediately before use.

Compositions for rectal administration are suppositories which contain, in addition to the active substance, excipients such as cocoa butter, or a suitable wax base.

The percentage of active ingredient in the compositions of the invention may be varied, it being necessary that it should constitute a proportion such that a suitable dosage shall be obtained. The dosages used depend on the therapeutic effect desired, on the method of administration, and on the duration of treatment. Given orally, the new compounds may generally be administered in a dose of from 5 mg. to 1000 mg. of active product per day for an adult.

The following examples exemplify pharmaceutical compositions in accordance with the invention.

Example 19

Tablets having the following composition are prepared in the usual manner.

|  | Mg. |
|---|---|
| 2 - methoxy - 11 - (4-methyl-1-piperazinyl)dibenzo[a,d]cycloheptadiene | 5 |
| Starch | 110 |
| Colloidal silica | 32 |
| Magnesium stearate | 3 |

Example 20

Tablets having the following composition are prepared in the usual manner.

|  | Mg. |
|---|---|
| 2 - chloro - 11 - (4 - methyl-1-piperazinyl)dibenzo[a,d]-cycloheptadiene | 25 |
| Starch | 92 |
| Colloidal silica | 30 |
| Magnesium stearate | 3 |

I claim:

1. Dibenzo[a,d]cycloheptadiene compound of the formula:

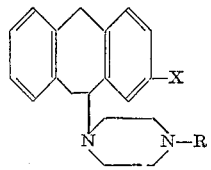

in which R is hydrogen, alkyl of 1 to 5 carbon atoms, hydroxyalkyl of 1 to 5 carbon atoms, hydroxyalkoxyalkyl of 1 to 5 carbon atoms in each allyl, alkenyl of 2 to 5 carbon atoms, alkynyl of 2 to 5 carbon atoms, phenylalkyl of 7 to 11 carbon atoms, or phenylalkyl of 7 to 11 carbon atoms substituted by alkoxy of 1 to 5 carbon atoms; X is halogen, cyano, alkyl of 1 to 5 carbon atoms, alkoxy of 1 to 5 carbon atoms, alkylthio of 1 to 5 carbon atoms, alkanesulphinyl of 1 to 5 carbon atoms, or alkanesulphonyl of 1 to 5 carbon atoms, and the piperazine ring is unsubstituted on the carbon atoms or substituted by methyl, and their non-toxic acid addition salts.

2. A dibenzo[a,d]cycloheptadiene compound as claimed in claim 1, in which X is chloro or methoxy, R is methyl, and the piperazine ring is unsubstituted, and its non-toxic addition salts.

3. A dibenzo[a,d]cycloheptadiene compound as claimed in claim 1, in which X is chloro, bromo, methyl, methoxy, cyano, methylthio, methanesulphinyl, or methanesulphonyl, R is hydrogen, methyl, ethyl, allyl, 2-propynyl, 2-hydroxyethyl, benzyl, or 4-methoxybenzyl, and the piperazine ring is unsubstituted, and its non-toxic acid addition salts.

4. A dibenzo[a,d]cycloheptadiene compound as claimed in claim 1, in which X is methoxy, R is methyl, and the piperazine ring is unsubstituted, and its non-toxic acid addition salts.

5. A dibenzo[a,d]cycloheptadiene compound as claimed in claim 1, in which X is chloro, R is methyl, and the piperazine ring is unsubstituted, and its non-toxic acid addition salts.

6. A dibenzo[a,d]cycloheptadiene compound as claimed in claim 1, in which X is chloro, R is benzyl, and the piperazine ring is unsubstituted, and its non-toxic acid addition salts.

7. A dibenzo[a,d]cycloheptadiene compound as claimed in claim 1, in which X is chloro, R is hydrogen, and the piperazine ring is unsubstituted, and its non-toxic acid addition salts.

8. A dibenzo[a,d]cycloheptadiene compound as claimed in claim 1, in which X is chloro, R is 4-methoxybenzyl, and the piperazine ring is unsubstituted, and its non-toxic acid addition salts.

9. A dibenzo[a,d]cycloheptadiene compound as claimed in claim 1, in which X is chloro, R is ethyl, and the piperazine ring is unsubstituted, and its non-toxic acid addition salts.

11. A dibenzo[a,d]cycloheptadiene compound as claimed in claim 1, in which X is chloro, R is allyl, and the piperazine ring is unsubstituted, and its non-toxic acid addition salts.

11. A dibenzo[a,d]cycloheptadiene compound as claimed in claim 1, in which X is chloro, R is 2-propynyl, and the piperazine ring is unsubstituted, and its non-toxic acid addition salts.

12. A dibenzo[a,d]cycloheptadiene compound as claimed in claim 1, in which X is chloro, R is 2-hydroxyethyl, and the piperazine ring is unsubstituted, and its non-toxic addition addition salts.

13. A dibenzo[a,d]cycloheptadiene compound as claimed in claim 1, in which X is bromo, R is methyl, and the piperazine ring is unsubstituted, and its non-toxic acid addition salts.

14. A dibenzo[a,d]cycloheptadiene compound as claimed in claim 1, in which X is cyano, R is methyl, and the piperazine ring is unsubstituted, and its non-toxic acid addition salts.

15. A dibenzo[a,d]cycloheptadiene compound as claimed in claim 1, in which X is methyl, R is methyl, and the piperazine ring is unsubstituted, and its non-toxic acid addition salts.

16. A dibenzo[a,d]cycloheptadiene compound as claimed in claim 1, in which X is methylthio, R is 4-methoxybenzyl, and the piperazine ring is unsubstituted, and its non-toxic acid addition salts.

17. A dibenzo[a,d]cycloheptadiene compound as claimed in claim 1, in which X is methylthio, R is hydrogen, and the piperazine ring is unsubstituted, and its non-toxic acid addition salts.

18. A dibenzo[a,d]cycloheptadiene compound as claimed in claim 1, in which X is methylthio, R is methyl, and the piperazine ring is unsubstituted, and its non-toxic acid addition salts.

19. A dibenzo[a,d]cycloheptadiene compound as claimed in claim 1, in which X is methanesulphinyl, R is methyl, and the piperazine ring is unsubstituted, and its non-toxic acid addition salts.

20. A dibenzo[a,d]cycloheptadiene compound as claimed in claim 1, in which X is methanesulphonyl, R is methyl, and the piperazine ring is unsubstituted, and its non-toxic acid addition.

References Cited

UNITED STATES PATENTS

| 3,052,721 | 9/1962 | Bernstein et al. | 260—268 X |
| 3,167,541 | 1/1965 | Van der Stelt | 260—268 X |
| 3,257,404 | 6/1966 | Fouche | 260—268 |

ALEX MAZEL, Primary Examiner

D. G. DAUS, Assistant Examiner

U.S. Cl. X.R.

260—470, 473, 520, 544, 590, 618, 687; 424—250